(12) United States Patent
Xu et al.

(10) Patent No.: US 12,035,237 B2
(45) Date of Patent: Jul. 9, 2024

(54) METHOD FOR DETECTING CONTROL CHANNEL AND TERMINAL DEVICE

(71) Applicant: GUANGDONG OPPO MOBILE TELECOMMUNICATIONS CORP., LTD., Guangdong (CN)

(72) Inventors: Weijie Xu, Guangdong (CN); Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 449 days.

(21) Appl. No.: 17/520,332

(22) Filed: Nov. 5, 2021

(65) Prior Publication Data

US 2022/0060985 A1 Feb. 24, 2022

Related U.S. Application Data (63) Continuation of application No. PCT/CN2019/086098, filed on May 9, 2019.

(51) Int. Cl.
*H04W 52/02* (2009.01)
*H04W 72/23* (2023.01)

(52) U.S. Cl.
CPC ....... *H04W 52/0229* (2013.01); *H04W 72/23* (2023.01)

(58) Field of Classification Search
CPC .......................... H04W 52/0229; H04W 72/23
See application file for complete search history.

(56) References Cited

U.S. PATENT DOCUMENTS

| | | | | |
|---|---|---|---|---|
| 2017/0019852 A1* | 1/2017 | Yang | .................. | H04W 52/0216 |
| 2017/0332386 A1* | 11/2017 | Li | ..................... | H04W 72/0446 |
| 2019/0075550 A1* | 3/2019 | Lee | ........................ | H04W 72/23 |
| 2021/0014886 A1* | 1/2021 | Lee | ........................ | H04L 1/1819 |
| 2022/0124622 A1* | 4/2022 | Islam | .................. | H04W 72/542 |
| 2022/0210736 A1* | 6/2022 | Ye | ..................... | H04W 72/1273 |

FOREIGN PATENT DOCUMENTS

| | | |
|---|---|---|
| CN | 102264148 A | 11/2011 |
| CN | 103493549 A | 1/2014 |
| CN | 107852651 A | 3/2018 |
| CN | 109309555 A | 2/2019 |
| WO | 2017195166 A1 | 11/2017 |

OTHER PUBLICATIONS

International Search Report (ISR) dated Jan. 19, 2020 for Application No. PCT/CN2019/086098.

* cited by examiner

*Primary Examiner* — Junpeng Chen
(74) *Attorney, Agent, or Firm* — Ladas & Parry LLP (57) ABSTRACT

Embodiments of the present application disclose a method for detecting a control channel and a terminal device. The method includes: a terminal device receives a first physical downlink control channel PDCCH, where the first PDCCH is used to schedule a first data channel, and the first PDCCH carries first indication information which is used to indicate execution of a skipping operation for a PDCCH by the terminal device; and the terminal device executes the skipping operation in case of successful transmission of the first data channel. The method and the terminal device in the embodiments of the present application can more dynamically support power saving of the terminal device.

20 Claims, 6 Drawing Sheets

A terminal device receives a first physical downlink control channel PDCCH within a time duration of a discontinuous reception DRX activity timer, where the first PDCCH is used to schedule a first data channel, and the first PDCCH carries first indication information which is used to indicate execution of a skipping operation for a PDCCH by the terminal device ~ 310

The terminal device executes the skipping operation according to the first indication information ~ 320

The terminal device suspends counting of the activity timer or counting of a DRX inactivity timer during the execution of the skipping operation, where the inactivity timer is started when the terminal device receives the first PDCCH ~ 330

FIG. 5

Terminal device 400

Transceiving unit 410

Processing unit 420

METHOD FOR DETECTING CONTROL CHANNEL AND TERMINAL DEVICE

CROSS-REFERENCE TO RELATED APPLICATIONS

This application is a continuation of International Application No. PCT/CN2019/086098, filed on May 9, 2019, entitled "METHOD FOR DETECTING CONTROL CHANNEL, AND TERMINAL DEVICE", the content of which is incorporated herein by reference in its entirety.

TECHNICAL FIELD

Embodiments of the present application relate to the field of communications and, in particular, to a method for detecting a control channel and a terminal device.

BACKGROUND

For the consideration of power saving of terminal devices, existing systems all support a discontinuous reception (Discontinuous Reception, DRX) transmission mechanism. The main principle is to realize discontinuous reception of signals in a time domain through a semi-static configuration. When there is no data transmission, power consumption can be reduced by means of stopping detecting physical downlink control channels (Physical Downlink Control Channel, PDCCH), thereby increasing battery life.

The existing DRX mechanism is relatively complicated in configuration and, generally, duration of a DRX activity timer cannot be adjusted according to an actual data arrival rate, and thus there is a relatively large limitation in terms of flexibility.

SUMMARY

Embodiments of the present application disclose a method for detecting a control channel and a terminal device, which can more dynamically support power saving of the terminal device.

In a first aspect, provided is a method for detecting a control channel. The method includes: receiving, by a terminal device, a first physical downlink control channel PDCCH, where the first PDCCH is used to schedule a first data channel, and the first PDCCH carries first indication information which is used to indicate execution of a skipping operation for a PDCCH by the terminal device; and executing, by the terminal device, the skipping operation in case of successful transmission of the first data channel.

In a second aspect, provided is a method for detecting a control channel. The method includes: receiving, by a terminal device, a first physical downlink control channel PDCCH within a time duration of a discontinuous reception DRX activity timer, where the first PDCCH is used to schedule a first data channel, and the first PDCCH carries first indication information which is used to indicate execution of a skipping operation for a PDCCH by the terminal device; executing, by the terminal device, the skipping operation according to the first indication information; and suspending, by the terminal device, counting of the activity timer or counting of a DRX inactivity timer during the execution of the skipping operation, where the inactivity timer is started when the terminal device receives the first PDCCH.

In a third aspect, provided is a terminal device for executing the method in any one of the first aspect to the second aspect described above or implementations thereof.

In a third aspect, provided is a terminal device for executing the method in any one of the first aspect to the second aspect described above or implementations thereof.

Specifically, the terminal device includes a functional module for executing the method in any one of the first aspect to the second aspect described above or implementations thereof.

In a fourth aspect, provided is a terminal device including a processor and a memory. The memory is configured to store a computer program, and the processor is configured to call and run the computer program stored in the memory to execute the method in any one of the first aspect to the second aspect described above or implementations thereof.

In a fifth aspect, provided is a chip for implementing the method in any one of the first aspect to the second aspect described above or implementations thereof.

Specifically, the chip includes: a processor, configured to call and run a computer program from a memory to enable a device installed with the chip to execute the method in any one of the first aspect to the second aspect described above or implementations thereof.

In a sixth aspect, provided is a computer readable storage medium configured to store a computer program that enables a computer to execute the method in any one of the first aspect to the second aspect described above or implementations thereof.

In a seventh aspect, provided is a computer program product including a computer program instruction that enables a computer to execute the method in any one of the first aspect to the second aspect described above or implementations thereof.

In an eighth aspect, provided is a computer program which, when running on a computer, enables the computer to execute the method in any one of the first aspect to the second aspect described above or implementations thereof.

With the above technical solution, information for PDCCH skipping (skipping) can be carried in a PDCCH which is used to schedule a data channel, and only in case of successful transmission of the data channel, can PDCCH skipping be performed according to the information for the PDCCH skipping carried in the PDCCH, so that the information for the PDCCH skipping can be dynamically adjusted, that is, power saving of the terminal device can be supported more dynamically. In addition, since PDCCH skipping is performed after the successful transmission of the data channel, it is also possible to improve reliability of data transmission.

DESCRIPTION OF EMBODIMENTS

The technical solution in the embodiments of the present application will described hereunder with reference to the accompanying drawings in the embodiments of the present application. Obviously, the described embodiments are a part of the embodiments of the present application, rather than all embodiments of the present application. All other embodiments obtained by persons of ordinary skill in the art based on the embodiments of the present application without paying any creative effort should fall into the protection scope of the present application.

It should be understood that the technical solution in the embodiments of the present application can be applied to various communication systems, for example, a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution LTE system, an LTE frequency division duplex (Frequency Division Duplex, FDD) system, an LTE time division duplex (Time Division Duplex, TDD) system, a universal mobile telecommunication system (Universal Mobile Telecommunication System, UMTS), a worldwide interoperability for microwave access (Worldwide Interoperability for Microwave Access, WiMAX) communication system, a new radio (New Radio, NR) system or a future 5G system, etc.

In particular, the technical solution in the embodiments of the present application can be applied to various communication systems that are based on a non-orthogonal multiple access technology, such as a sparse code multiple access (Sparse Code Multiple Access, SCMA) system, a low density signature (Low Density Signature, LDS) system, etc. Certainly, the SCMA system and the LDS system can also be termed otherwise in the field of communications; further, the technical solution in the embodiments of the present application can be applied to multi-carrier transmission systems that adopt the non-orthogonal multiple access technology, such as orthogonal frequency division multiplexing (Orthogonal Frequency Division Multiplexing, OFDM), filter bank multi-carrier (Filter Bank Multi-Carrier, FBMC), generalized frequency division multiplexing (Generalized Frequency Division Multiplexing, GFDM), filtered orthogonal frequency division multiplexing (Filtered-OFDM, F-OFDM) systems using the non-orthogonal multiple access technology, etc.

Figure 1:
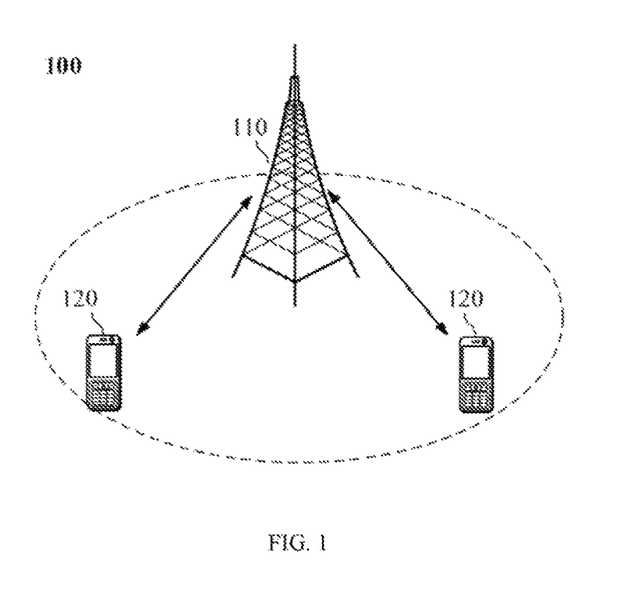
FIG. 1 is a schematic diagram illustrating a communication system architecture according to an embodiment of the present application.

Exemplarily, a communication system 100 applied in an embodiment of the present application is shown in FIG. 1. The communication system 100 may include a network device 110. The network device 110 may be a device that communicates with a terminal device 120 (or termed as a communication terminal or a terminal). The network device 110 may provide a particular geographic area with communication coverage and may communicate with a terminal device located within the coverage. In an embodiment, the network device 110 may be a base station (Base Transceiver Station, BTS) in the GSM system or the CDMA system, or a base station (NodeB, NB) in the WCDMA system, or an evolutional base station (Evolutional Node B, eNB or eNodeB) in the LTE system, or a wireless controller in a cloud radio access network (Cloud Radio Access Network, CRAN), alternatively, the network device may be a mobile switching center, a relay station, an access point, a vehicle-mounted device, a wearable device, a hub, a switch, a bridge, a router, a network device gNB in a 5G network, or a network device in a future evolutional public land mobile network (Public Land Mobile Network, PLMN), etc.

The communication system 100 also includes at least one terminal device 120 located within the coverage of the network device 110. The "terminal device" used herein includes, but not limited to a user equipment (User Equipment, UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with wireless communication functions, a computing device or other processing device connected to a wireless modem, a vehicle-mounted device, a wearable device, a terminal device in the future 5G network, or a terminal device in the future evolutional public land mobile network (Public Land Mobile Network, PLMN), etc., the embodiments of the present application are not limited thereto.

In an embodiment, device to device (Device to Device, D2D) communications may be performed between the terminal devices 120.

In an embodiment, the 5G system or the 5G network may also be termed as a new radio (New Radio, NR) system or an NR network.

FIG. 1 exemplarily shows one network device and two terminal devices. In an embodiment, the communication system 100 may include multiple network devices and other numbers of terminal devices may be included within the coverage of each of the network devices, which is not limited in the embodiments of the present application.

In an embodiment, the communication system 100 may further include other network entities, such as a network controller, a mobility management entity and the like, which is not limited in the embodiments of the present application.

It should be understood that devices with communication functions in the network/system according to the embodiments of the present application may be termed as communication devices. Taking the communication system 100 shown in FIG. 1 as an example, the communication devices may include the network device 110 and the terminal device 120 with communication functions, and the network device 110 and the terminal device 120 may be specific devices described above, and details will not be described herein again. The communication devices may also include other devices in the communication system 100, e.g., other network entities such as a network controller, a mobility management entity and the like, which is not limited in the embodiments of the present application.

It should be understood that the terms "system" and "network" are often used interchangeably herein. The term such as "and/or" herein merely describes an association relationship between associated objects, which indicates that there may be three relationships, for example, A and/or B may indicate presence of A only, of both A and B, and of B only. In addition, the character "/" herein generally indicates that contextual objects have an "or" relationship.

For the consideration of power saving of terminal devices, existing systems all support a DRX transmission mechanism. The main principle is to realize discontinuous reception of signals in the time domain through a semi-static configuration. When there is no data transmission, power consumption can be reduced by means of stopping detecting PDCCHs, thereby increasing battery life.

Figure 2:
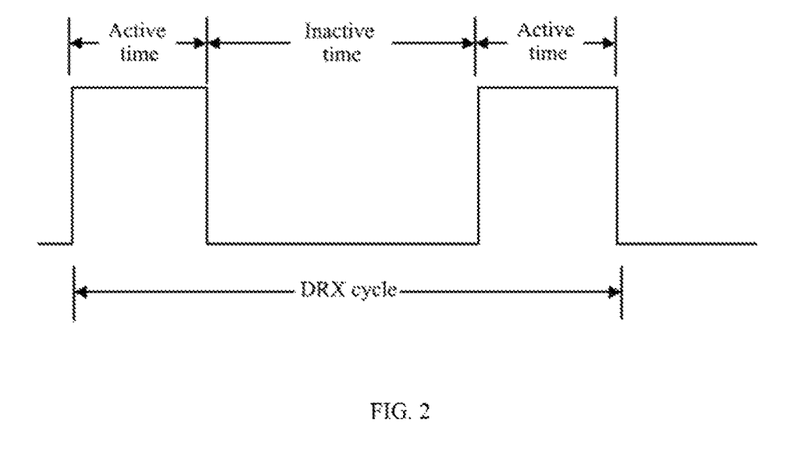
FIG. 2 is a schematic diagram illustrating DRX active time and inactive time configurations.

For example, in the existing LTE system, a DRX configuration method is to configure a DRX cycle (cycle) for a UE in an RRC_CONNECTED state. As shown in FIG. 2, the DRX cycle is composed of "active time (Active Time)" and "inactive time (inactive Time)": During the "Active Time" period, the UE monitors and receives a PDCCH (active time); during the "Inactive Time" period, the UE does not receive a PDCCH to reduce power consumption (also termed as a sleep period). In addition, transmission of paging messages is also a DRX mechanism in an RRC_IDLE state, at this time, the DRX cycle is a cycle for the paging message.

How to form "Active Time" and "Inactive Time": time is divided into continuous DRX Cycles. At the beginning of each DRX cycle, an activity timer (DRX ON tinier) is started, and the UE may detect the PDCCH during the Active Time according to a configured monitoring occasion (Monitoring Occasion, MO). When the UE detects the PDCCH, an inactivity timer (Inactivity Timer) may also be started and refreshed. If the DRX ON timer does not expire or the UE is in the Active Time when the Inactivity Timer does not expire, the UE in the Active Time needs to detect the PDCCH.

LTE's energy saving mechanism is also used in the 5G NR, whose defined DRX configuration method inherits LTE's DRX configuration. In 5G and LTE evolutional projects, an enhancement mechanism for DRX is currently under discussion. For example, although the network has configured the DRX mechanism for the terminal, the terminal is only scheduled occasionally during the periodic active time, even when the terminal is at a very low traffic load, the terminal is scheduled only in a few DRX cycles; for a paging message using the DRX mechanism, the terminal has fewer occasions to receive the paging message. That is to say, there is a case that no data scheduling is detected for PDCCH detections in most of the active times, so there is room for further optimization. One solution is to transmit an energy saving signal to the terminal if the network determines that the terminal needs to be scheduled during the DRX active time, where the energy saving signal is used to wake up the terminal so that the terminal performs PDCCH detection during the DRX active time.

Since the DRX mechanism is relatively complicated in configuration, which is mainly in semi-static configuration, therefore, there is a relatively large limitation in terms of flexibility. However, if the indication mode using the energy saving signal enhances DRX, energy saving of the terminal can be achieved more effectively. However, there may be a certain probability of missed detection with this mechanism, and the energy saving signal is an additional physical layer signal requiring occupation of more radio resources, especially, a large number of radio resources will be consumed if there are a great number of terminals under scheduling, so that normal scheduling and transmission of uplink and downlink data will be affected.

Therefore, in order to solve the above problem, an embodiment of the present application proposes a PDCCH skipping solution. The overall idea is to carry information for PDCCH skipping in a PDCCH that is used to schedule a data channel.

Figure 3:
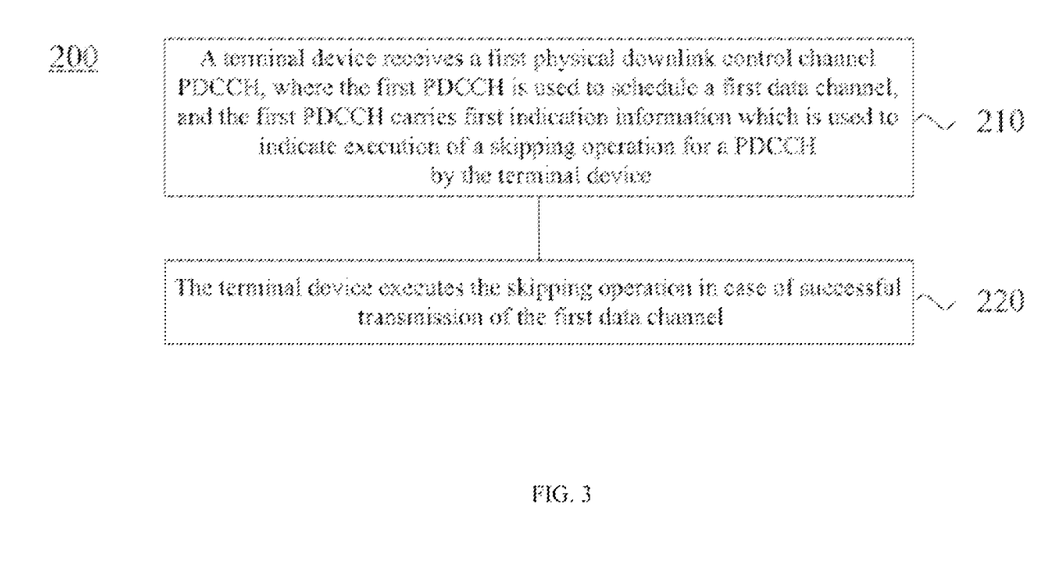
FIG. 3 is a schematic block diagram of a method for detecting a control channel according to an embodiment of the present application.

FIG. 3 shows a schematic block diagram of a method 200 for detecting a control channel according to an embodiment of the present application. As shown in FIG. 3, the method 200 includes a part of or all of the following content:

S210, a terminal device receives a first physical downlink control channel PDCCH, where the first PDCCH is used to schedule a first data channel, and the first PDCCH carries first indication information which is used to indicate execution of a skipping operation for a PDCCH by the terminal device; and S220, the terminal device executes the skipping operation in case of successful transmission of the first data channel.

Specifically, when there is a data channel which needs to be transmitted, the network device needs to send a PDCCH to the terminal device, mainly including resource allocation information for uplink and downlink data transmission. The network device may carry first indication information, in the PDCCH that schedules the data channel, for a skipping operation of a PDCCH. The so-called skipping operation for the PDCCH is the PDCCH skipping described above. After receiving the PDCCH that carries the first indication information, the terminal device may perform the PDCCH skipping indicated by the first indication information. In an embodiment, the first indication information may indicate triggering information for the PDCCH skipping, that is to say, the terminal device may execute the PDCCH skipping after acquiring the first indication information. The time duration of the PDCCH skipping may be agreed in advance by the protocol, or configured semi-statically by the network device, or may also be indicated by the first indication information. For example, the first indication information may include two bits, where "00" indicates that the terminal device is not triggered to perform PDCCH skipping, "01" indicates that the time duration in which the terminal device performs PDCCH skipping is of 1 time unit, and "10" indicates that the time duration in which the terminal device performs PDCCH skipping is of 2 time units, "11" indicates that the time duration in which the terminal device performs PDCCH skipping is of 3 time units, and so on. The terminal device may obtain a corresponding relationship between the value of the first indication information and the number of time units in advance. After the terminal device obtains the PDCCH in the embodiment of the present application, a corresponding number of time units can be determined according to the value of the first indication information in the PDCCH, so that PDCCH skipping of a corresponding time duration may be performed.

In an embodiment, the terminal device may start to perform PDCCH skipping immediately upon reception of the PDCCH. In a further alternative embodiment, the terminal device may first determine whether transmission of the data channel is successful, and then perform PDCCH skipping in case of successful transmission of the data channel. In case of unsuccessful transmission of the data channel, the terminal device may not perform PDCCH skipping, or the terminal device may delay performing PDCCH skipping and perform PDCCH skipping till retransmission of the data channel is successful.

PDCCH skipping is performed in case of successful transmission of the data channel so that the terminal device will not blindly perform PDCCH skipping without transmission of the data channel, which is beneficial to improving reliability of data transmission.

In an embodiment, during a period when PDCCH skipping is performed, the terminal device may not turn off channel measurement. For example, during a period when PDCCH skipping is performed, channel state information (Channel State Information, CSI) measurement and/or aperiodic sounding reference signal (Sounding Reference Signal, SRS) triggering may still be performed. In this way, the accuracy of the channel information on the data scheduling can be guaranteed.

In an embodiment, as known above, the first indication information may be used to indicate a first time duration associated with PDCCH skipping. Specifically, the first time duration may include a time duration in which the terminal device performs PDCCH skipping. After the terminal device acquires the first time duration, the first time duration may not be limited with regard to its starting time. For example, the starting time of the first time duration is time when a corresponding PDCCH is received. Specifically, the first indication information indicates 5 time units; the terminal device starts counting when the PDCCH is received, and determines that the transmission of the data channel is successful when the counting reaches the second time unit, then the terminal device may perform PDCCH skipping at this time, and the terminal device finishes performing the PDCCH skipping till the count value is 5 time units. For another example, the starting time of the first time duration is time when the terminal device determines that the transmission of the data channel is successful. Specifically, the first indication information indicates 5 time units, the terminal device may perform counting only when determining that the transmission of the data channel scheduled by the PDCCH is successful, and PDCCH skipping is performed throughout the counting process; and the terminal device finishes performing the PDCCH skipping when the counting reaches the fifth time unit.

In an embodiment, in an embodiment of the present application, the first time duration indicated by the first indication information may be a fixed time duration, or may include at least one time unit, where the time unit may be, for example, a PDCCH MO, a slot, or a symbol, etc. The time unit may also be a fixed time interval, and the first time duration may include at least one fixed time interval. If the first time duration includes at least one time unit, the number of time units and indicator bits indicated by the first indication information may be configured by higher-layer radio resource control (Radio Resource Control, RRC). For example, the time unit is a PDCCH MO, in case of 2 bits, "00" indicates that a following PDCCH MO is not to be ignored, in other words, when the first indication information in the PDCCH received by the terminal device is 00, the terminal device may hold that it is a normal PDCCH; "01" indicates that following a PDCCH MOs are to be ignored; "10" indicates the following b PDCCH MOs are to be ignored; "11" indicates that the following c PDCCH MOs are to be ignored. Moreover, a, b, and c all are positive integers. The network device can adjust the bit value of the first indication information according to the transmission of the data channel, so that the number of PDCCH MOs to be ignored can be adjusted and power saving of the terminal can be achieved flexibly.

In an embodiment, the terminal device may start counting the number of PDCCH MOs indicated by the first indication information from a start position where the PDCCH is received, or it may start counting from the successful transmission of the current scheduled data channel. In addition, the terminal device only starts to perform PDCCH skipping in case of successful transmission the data channel, that is to say, when transmission of the data channel fails, if the counting of the PDCCH MOs starts from a time when the PDCCH is received, then the counting can be stopped, and the PDCCH skipping can be temporarily not performed or discarded directly. If the PDCCH skipping is not performed temporarily, the terminal device may subsequently receive a PDCCH for retransmission of the data channel scheduled by the previous PDCCH. At this point, the counting of the number of PDCCH MOs indicated by the first indication information in the previous PDCCH may be started again, and the terminal device performs the PDCCH skipping indicated by the first indication information in the previous PDCCH in case of successful retransmission of the data channel. If the PDCCH skipping is discarded, the PDCCH subsequently received by the terminal device is used to schedule another data channel, a corresponding PDCCH may carry second indication information which will also indicate information for PDCCH skipping, and then the terminal device may perform PDCCH skipping indicated by the second indication information in case of successful transmission of the current scheduled data channel. The information for the PDCCH skipping indicated by the first indication information and the second indication information may be the same or different.

In an embodiment, if the time unit is in another unit, such as a slot, PDCCH skipping can be performed using a method similar to that for PDCCH MO. For the sake of brevity, details will not be described here again.

In an embodiment, in an embodiment of the present application, a search space (search space) to which the PDCCH being targeted by the PDCCH skipping belongs may be any search space monitored by the terminal device. That is to say, the time unit of the PDCCH being targeted by the PDCCH skipping may be applicable to all search spaces monitored by the terminal device. Further, the search space to which the PDCCH being targeted by the PDCCH skipping belongs is a dedicated search space. That is to say, the time unit of the PDCCH being targeted by the PDCCH skipping may be applicable to all UE-specific search spaces monitored by the terminal device. Alternatively, the search space to which the PDCCH being targeted by the skipping operation belongs is a search space configured with a specific radio network temporary identifier (Radio Network Temporary identifier, RNTI). That is to say, the time unit of the PDCCH being targeted by the PDCCH skipping is applicable to a set of search spaces configured with specific RNTIs monitored by the terminal device. For example, a cell radio network temporary identifier (Cell Radio Network Temporary Identifier, C-RNTI) is only applicable to a search space in which a data channel is scheduled.

In an embodiment, the data channel (such as the first data channel in the foregoing) in the embodiment of the present application may be an uplink data channel or a downlink data channel. That is, it may be a physical uplink shared channel (Physical Uplink Shared Channel, PUSCH) or a physical downlink shared channel (Physical Downlink Shared Channel, PDSCH).

The embodiments of the present application will be described hereunder in detail in conjunction with the first data channel being a PDSCH and a PUSCH respectively.

Figure 4:
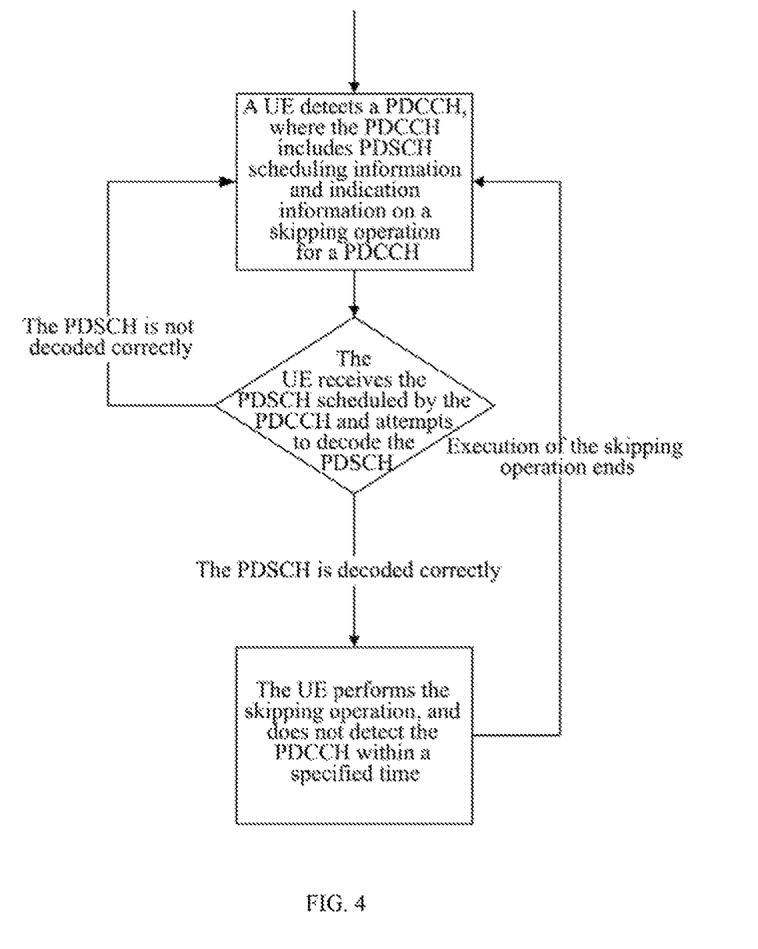
FIG. 4 is a schematic flowchart of a method for detecting a control channel according to an embodiment of the present application.

As shown in FIG. 4, first, a UE detects a PDCCH transmitted by a network, where the PDCCH includes PDSCH scheduling information and indication information for PDCCH skipping, after receiving a PDSCH scheduled by the PDCCH, the UE attempts to decode the PDSCH, if the PDSCH is decoded correctly, then the UE performs PDCCH skipping indicated by the network, that is to say, detection of PDCCHs is not performed within the time indicated by the indication information for the PDCCH skipping, after the PDCCH skipping is performed within the specified time, the terminal device then continues to detect the PDCCH; if the PDSCH is not decoded correctly, then the terminal device does not perform PDCCH skipping (it can also be considered that the PDCCH skipping is invalid), but continues to detect the PDCCH. That is to say, the terminal device can determine whether transmission of the PDSCH is successful according to whether the PDSCH is decoded correctly.

For the PUSCH, similarly, a UE first detects a PDCCH transmitted by a network, where the PDCCH includes PUSCH scheduling information and indication information for PDCCH skipping. After transmitting a PUSCH to the network, the UE needs to wait for a certain time duration, if in turn the PDCCH transmitted by the network for retransmission of the PUSCH is received within this time duration, the UE may determine that PUSCH transmission fails, and the UE continues to retransmit the PUSCH, for the UE, if the network still does not receive the PUSCH after the number of retransmissions is reached, then the UE may not perform PDCCH skipping (it can also be considered that the PDCCH skipping is invalid), but continue to detect the PDCCH; if the PDCCH transmitted by the network for retransmission of the PUSCH has not been received by the UE within this time duration, then the UE may determine that PUSCH transmission is successful, and the UE performs the PDCCH skipping indicated by the network, that is, detection of PDCCHs is not performed within the time indicated by the indication information for the PDCCH skipping, after the PDCCH skipping is performed within the specified time, the terminal device then continues to detect the PDCCH. It should be understood that the time duration that the UE waits after transmitting the PUSCH may be set based on timing of data scheduling, for example, it may wait for 8 slots.

It should be understood that the scenario in the embodiments of the present application is not limited to a single carrier or a single bandwidth part (Bandwidth Part, BWP), and can also be applied to multiple carriers or multiple BWPs.

It should also be understood that the embodiments of the present application can also be applied to other behaviors of the UE. For example, the UE can turn off reception of other signals according to signaling, e.g., turn off channel measurement of the UE or turn off data reception of the UE. The behavior of the UE can also be extended to a transmitting behavior, that is, triggering UE discontinuous transmission (Discontinuous Transmission, DTX).

According to the embodiments of the present application, indication of the terminal's power saving may be possibly not dependent on other energy saving signals. For a dedicated energy saving signal, there is a certain probability of missed detection. The present solution is extension based on the existing scheduling PDCCH, and the extended PDCCH supports both an energy saving indication function and a scheduling function of the data channel. No additional energy saving physical layer signal is required. This greatly saves radio resources. Bits for the information indicator in the embodiments of the present application account for a small proportion in the PDCCH. The embodiments of the present application can support energy saving of the UE more dynamically than the DRX mechanism. A scale of adaptive time for energy saving can be reduced in level from tens of microseconds to microseconds.

Figure 5:
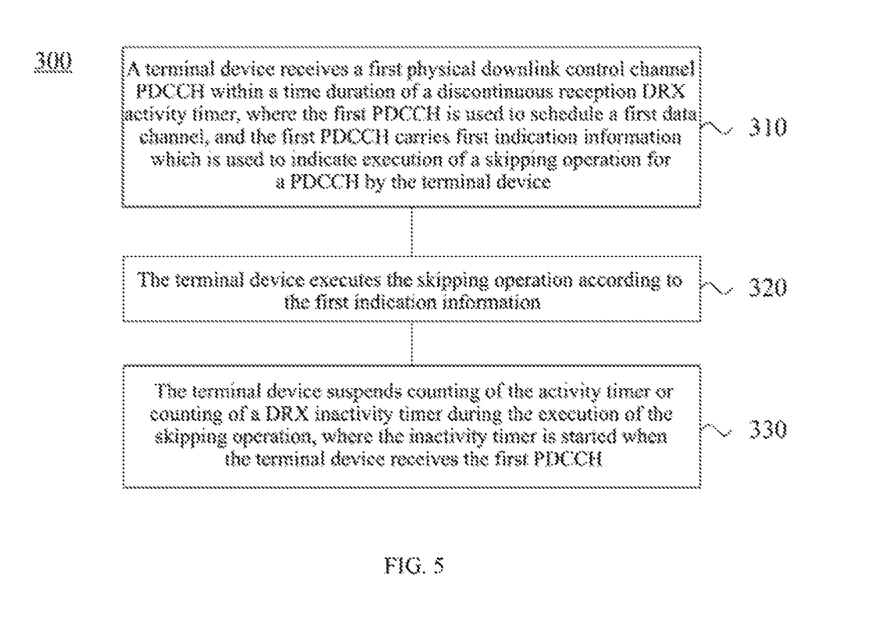
FIG. 5 is another schematic block diagram of a method for detecting a control channel according to an embodiment of the present application.

FIG. 5 shows a schematic block diagram of a method 300 for detecting a control channel according to an embodiment of the present application. As shown in FIG. 5, the method 300 includes a part of or all of the following content:

S310, a terminal device receives a first physical downlink control channel PDCCH within a time duration of a discontinuous reception DRX activity timer, where the first PDCCH is used to schedule a first data channel, and the first PDCCH carries first indication information which is used to indicate execution of a skipping operation for a PDCCH by the terminal device;

S320, the terminal device executes the skipping operation according to the first indication information; and S330, the terminal device suspends counting of the activity timer or counting of a DRX inactivity timer during the execution of the skipping operation, where the inactivity timer is started when the terminal device receives the first PDCCH.

Specifically, a network device can configure both PDCCH skipping and DRX for a terminal device, where configuring DRX for the terminal device generally means to configure a DRX activity timer and/or an inactivity timer. For details on the activity timer and the inactivity timer, reference may be made to the above description, which will not be described here again. That is to say, PDCCH skipping can be used in conjunction with DRX. When the terminal device receives a PDCCH carrying indication information for PDCCH skipping, the UE may perform PDCCH skipping according to the indication information, and the DRX activity timer or the inactivity timer may continue counting during a period when the PDCCH skipping is performed, but only without PDCCH detection, that is to say, during this period of time, the terminal device can still perform channel measurement. For example, during a period when PDCCH skipping is performed, CSI measurement and/or aperiodic SRS triggering may still be performed. In this way, the accuracy of the channel information on the data scheduling can be guaranteed. Alternatively, during a period when PDCCH skipping is performed, the DRX activity timer or the inactivity timer may suspend counting, while the counting of the activity timer or the inactivity timer may be resumed after the terminal device performs the PDCCH skipping. In this way, the terminal device can flexibly receive discontinuous data and can achieve a certain power saving effect.

Further, the terminal device may also perform PDCCH skipping in case of successful transmission of the data channel scheduled by the PDCCH (that is, the PDCCH skipping is valid, or indication information in the PDCCH used to indicate the PDCCH skipping is valid), and meanwhile the activity timer or the inactivity timer may suspend counting. However, in the case where the transmission of the data channel scheduled by the PDCCH fails, discarding performing the PDCCH skipping or waiting to perform the PDCCH skipping until retransmission of the data channel is successful, and meanwhile the activity timer or the inactivity timer may suspend counting.

It should be understood that reference may be made to the description in the method 200 for the content related to the PDCCH skipping in the method 300, and for the sake of brevity, details will not be described here again.

It should be understood that in various embodiments of the present application, the sequence numbers of the above-mentioned processes do not mean a chronological order of execution, and the chronological order of execution for the processes should be determined by their functions and internal logic, but should not impose any limitation to implementations of the embodiments of the present application.

The method for detecting the control channel according to the embodiments of the present application have been described in detail above, while an apparatus for detecting a control channel according to embodiments of the present application will be described below in conjunction with FIG. 6 to FIG. 8, and technical features described in the method embodiments are applicable to the following apparatus embodiments.

Figure 6:
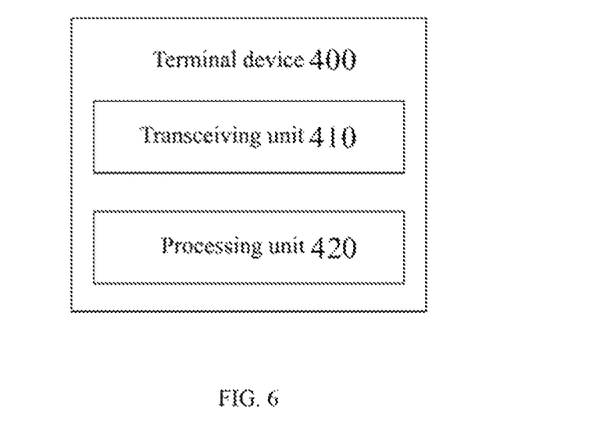
FIG. 6 is a schematic block diagram of a terminal device according to an embodiment of the present application.

FIG. 6 shows a schematic block diagram of a terminal device 400 according to an embodiment of the present application. As shown in FIG. 6, the terminal device 400 includes:

- a transceiving unit 410, configured to receive a first physical downlink control channel PDCCH, where the first PDCCH is used to schedule a first data channel, and the first PDCCH carries first indication information which is used to indicate execution of a skipping operation for a PDCCH by the terminal device 400; and
- a processing unit 420, configured to execute the skipping operation in case of successful transmission of the first data channel.

In an embodiment, in an embodiment of the present application, the processing unit is further configured to: discard the execution of the skipping operation in case of unsuccessful transmission of the first data channel.

In an embodiment, in an embodiment of the present application, the processing unit is further configured to: execute the skipping operation in case of unsuccessful transmission of the first data channel and successful retransmission of the first data channel.

In an embodiment, in an embodiment of the present application, the first indication information is further used to indicate a first time duration that includes a time duration in which the skipping operation is executed.

In an embodiment, in an embodiment of the present application, starting time of the first time duration is time when the terminal device 400 determines that the transmission of the first data channel is successful.

In an embodiment, in an embodiment of the present application, the first time duration includes at least one time unit which is a PDCCH monitoring occasion or a slot.

In an embodiment, in an embodiment of the present application, the first data channel is a first physical downlink shared channel PDSCH, and the processing unit 420 is further configured to: determine, according to whether the first PDSCH is decoded successfully, whether transmission of the first PDSCH is successful.

In an embodiment, in an embodiment of the present application, the first data channel is a first physical uplink shared channel PUSCH, and the processing unit 420 is further configured to: determine, according to whether a second PDCCH is detected within a second time duration subsequent to reception of the first PDCCH, whether transmission of the first PUSCH is successful, where the second PDCCH is used to indicate retransmission of the first PUSCH by the terminal device 400.

In an embodiment, in an embodiment of the present application, the processing unit 420 is further configured to: perform channel state information CSI measurement and/or aperiodic sounding reference signal SRS triggering during the execution of the skipping operation.

In an embodiment, in an embodiment of the present application, a search space to which the PDCCH being targeted by the skipping operation belongs is any search space monitored by the terminal device 400.

In an embodiment, in an embodiment of the present application, a search space to which the PDCCH being targeted by the skipping operation belongs is a dedicated search space, and/or a search space to which the PDCCH being targeted by the skipping operation belongs is a search space configured with a specific radio network temporary identifier RNTI.

It should be understood that the terminal device 400 according to the embodiment of the present application may correspond to the terminal device in the method embodiment of the present application, and the above-mentioned and other operations and/or functions of each unit in the terminal device 400 are intended to implement corresponding processes of the terminal device in the method of FIG. 3, respectively. For the sake of brevity, details will not be described here again.

Figure 7:
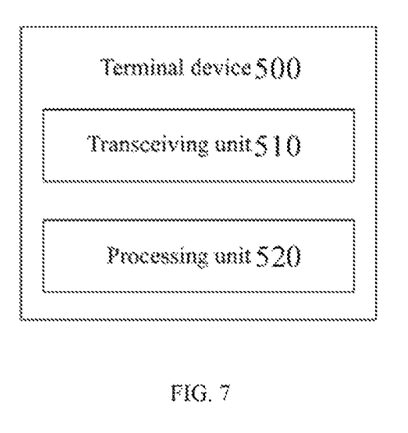
FIG. 7 is a schematic block diagram of a terminal device according to an embodiment of the present application.

FIG. 7 shows a schematic block diagram of a terminal device 500 according to an embodiment of the present application. As shown in FIG. 7, the terminal device 500 includes:

- a transceiving unit 510, configured to receive a first physical downlink control channel PDCCH within a time duration of a discontinuous reception DRX activity timer, where the first PDCCH is used to schedule a first data channel, and the first PDCCH carries first indication information which is used to indicate execution of a skipping operation for a PDCCH by the terminal device; and
- a processing unit 520, configured to execute the skipping operation according to the first indication information; where the processing unit 520 is further configured to: suspend counting of the activity timer or counting of a DRX inactivity timer during the execution of the skipping operation, where the inactivity timer is started when the terminal device receives the first PDCCH.

In an embodiment, in an embodiment of the present application, the processing unit 520 is further configured to: resume the counting of the activity timer or the counting of the inactivity timer after the execution of the skipping operation.

In an embodiment, in an embodiment of the present application, the processing unit 520 is specifically configured to: execute the skipping operation according to the first indication information in case of successful transmission of the first data channel.

In an embodiment, in an embodiment of the present application, the first indication information is further used to indicate a first time duration that includes a time duration in which the skipping operation is executed.

In an embodiment, in an embodiment of the present application, starting time of the first time duration is time when the terminal device determines that the transmission of the first data channel is successful.

In an embodiment, in an embodiment of the present application, the first time duration includes at least one time unit which is a PDCCH monitoring occasion or a slot.

In an embodiment, in an embodiment of the present application, the first data channel is a first physical downlink shared channel PDSCH, and the processing unit 520 is further configured to: determine, according to whether the first PDSCH is decoded successfully, whether transmission of the first PDSCH is successful.

In an embodiment, in an embodiment of the present application, the first data channel is a first physical uplink shared channel PUSCH, and the processing unit 520 is further configured to: determine, according to whether a second PDCCH is detected within a second time duration subsequent to reception of the first PDCCH, whether transmission of the first PUSCH is successful, where the second PDCCH is used to indicate retransmission of the first PUSCH by the terminal device.

In an embodiment, in an embodiment of the present application, the processing unit 520 is further configured to: perform channel state information CSI measurement and/or aperiodic sounding reference signal SRS triggering during the execution of the skipping operation.

It should be understood that the terminal device 500 according to the embodiment of the present application may correspond to the terminal device in the method embodiment of the present application, and the above-mentioned and other operations and/or functions of each unit in the terminal device 500 are intended to implement corresponding processes of the terminal device in the method of FIG. 5, respectively. For the sake of brevity, details will not be described here again.

Figure 8:
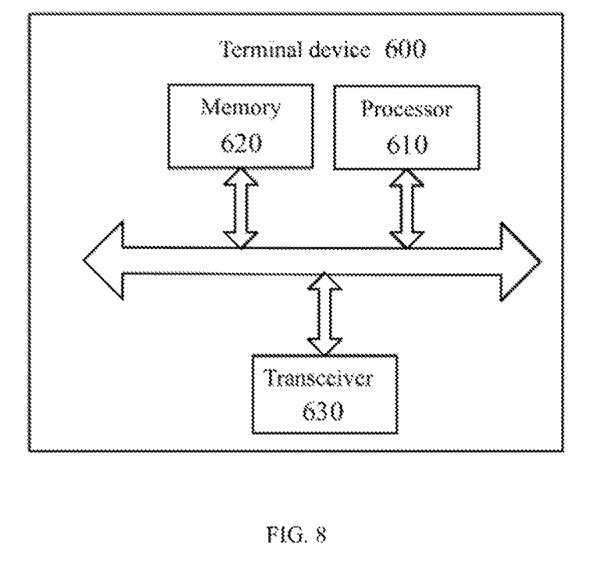
FIG. 8 is another schematic block diagram of a terminal device according to an embodiment of the present application.

As shown in FIG. 8, an embodiment of the present application further provides a terminal device 600. The terminal device 600 may be the terminal device 400 in FIG. 6 and the terminal device 500 in FIG. 7, which can be configured to implement the content of the terminal devices corresponding to the methods in FIG. 3 and FIG. 5. The terminal device 600 shown in FIG. 8 includes a processor 610, where the processor 610 can call and run a computer program from a memory to implement the method in the embodiment of the present application.

In an embodiment, as shown in FIG. 8, the terminal device 600 may further include a memory 620, where the processor 610 may call and run a computer program from the memory 620 to implement the method in the embodiments of the present application.

The memory 620 may be a separate device independent of the processor 610, or may be integrated in the processor 610.

In an embodiment, as shown in FIG. 8, the terminal device 600 may further include a transceiver 630, and the processor 610 may control the transceiver 630 to communicate with a further device, in particular, it may transmit information or data to the further device, or receive information or data transmitted from the further device.

The transceiver 630 may include a transmitter and a receiver. The transceiver 630 may further include an antenna, and there may be one or more antennas in number.

In an embodiment, the terminal device 600 may be a terminal device according to an embodiment of the present application, and the terminal device 600 may implement corresponding processes implemented by the terminal devices in the methods according to the embodiments of the present application. For the sake of brevity, details will not be described here again.

In a specific implementation, the transceiving unit 410 in the terminal device 400 may be implemented by the transceiver 630 in FIG. 8. The processing unit 420 in the terminal device 400 may be implemented by the processor 610 in FIG. 8. The transceiving unit 510 in the terminal device 500 may be implemented by the transceiver 630 in FIG. 8. The processing unit 520 in the terminal device 500 may be implemented by the processor 610 in FIG. 8.

Figure 9:
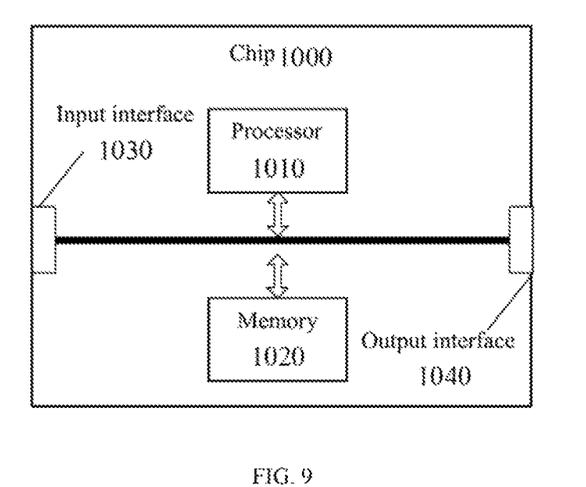
FIG. 9 is a schematic block diagram of a chip according to an embodiment of the present application.

FIG. 9 is a schematic structural diagram of a chip according to an embodiment of the present application. The chip 1000 shown in FIG. 9 includes a processor 1010 which may call and run a computer program from a memory to implement a method in an embodiment of the present application.

In an embodiment, as shown in FIG. 9, the chip 1000 may further include a memory 1020. The processor 1010 may call and run a computer program from the memory 1020 to implement a method in an embodiment of the present application.

The memory 1020 may be a separate device independent of the processor 1010 or may be integrated in the processor 1010.

In an embodiment, the chip 1000 may further include an input interface 1030. The processor 1010 may control the input interface 1030 to communicate with a further device or chip, in particular, to acquire information or data transmitted by the further device or chip.

In an embodiment, the chip 1000 may further include an output interface 1040. The processor 1010 may control the output interface 1040 to communicate with a further device or chip, in particular, to output information or data to the further device or chip.

In an embodiment, the chip 1000 can be applied to a terminal device in an embodiment of the present application; moreover, the chip 1000 may perform corresponding processes implemented by the terminal devices in the methods according to the embodiments of the present application. For the sake of brevity, details will not be described here again.

It should be understood that the chip 1000 mentioned in the embodiment of the present application may also be termed as a system level chip, a system chip, a chip system or a system-on-chip, and the like.

It should be understood that the processor 1010 according to the embodiment of the present application may be an integrated circuit chip with signal processing capabilities. During implementation, the steps of the foregoing method embodiments can be completed by a hardware integrated logic circuit or a software instruction in the processor 1010. The above processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gate or transistor logic devices, discrete hardware components. The methods, steps, and logical block diagrams disclosed in the embodiments of the present application may be implemented or performed. The general purpose processor may be a microprocessor or the processor may also be any conventional processor or the like. The steps of the methods disclosed in the embodiments of the present application may be directly implemented by the hardware decoding processor, or may be performed by a combination of hardware and software modules in the decoding processor. The software module may be located in a storage medium mature in the art, such as a random access memory, a flash memory, a read only memory, a programmable read only memory, an electrically erasable programmable memory, a register, or the like. The storage medium is located in the memory. The processor reads information in the memory and performs the steps of the above methods in combination with its hardware.

It can be understood that the memory 1020 in the embodiments of the present application may be a volatile memory or a non-volatile memory, or may include both the volatile memory and the non-volatile memory. The non-volatile memory may be a read-only memory (Read-Only Memory, ROM), a programmable read only memory (Programmable ROM, PROM), an erasable programmable read only memory (Erasable PROM, EPROM), an electrically erasable programmable read only memory (Electrically EPROM, EEPROM) or a flash memory. The volatile memory may be a random access memory (Random Access Memory, RAM) is used as an external cache. By way of exemplary but not restrictive illustration, many forms of RAMs may be available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct Rambus random access memory (Direct Rambus RAM, DR RAM). It should be noted that the memories of the systems and methods described herein are intended to include, but are not limited to these and any other suitable types of memories.

It should be understood that the above mentioned memory is exemplary but not restrictive illustration, for example, the memory 1020 in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct Rambus random access memory (Direct Rambus RAM, DR RAM), etc. That is to say, the memories in the embodiments of the present application are intended to include, but are not limited to these and any other suitable types of memories.

An embodiment of the present application further provides a computer readable storage medium configured to store a computer program.

In an embodiment, the computer readable storage medium may be applied to the terminal device in the embodiments of the present application, and the computer program enables a computer to perform corresponding processes implemented by the mobile terminal/the terminal device in various methods of the embodiments of the present application. For the sake of brevity, details will not be described here again.

An embodiment of the present application further provides a computer program product including a computer program instruction.

In an embodiment, the computer program product may be applied to the terminal device in the embodiments of the present application, and the computer program instruction enables a computer to perform corresponding processes implemented by the mobile terminal/the terminal device in various methods of the embodiments of the present application. For the sake of brevity, details will not be described here again.

An embodiment of the present application further provides a computer program.

In an embodiment, the computer program may be applied to the terminal device in the embodiments of the present application. The computer program which, when running on a computer, enables the computer to perform corresponding processes implemented by the terminal device in various methods of the embodiments of the present application. For the sake of brevity, details will not be described here again.

It may be known to persons of ordinary skill in the art that, the units and the algorithm steps of each example that are described with reference to the embodiments disclosed herein can be implemented by electronic hardware or a combination of electronic hardware and computer software. The situation whether these functions are performed by hardware or software depends on specific applications and design constraints of the technical solution. Persons skilled in the art may implement the described functions by using different methods for each specific application, and such implementation should not be regarded as going beyond the scope of the present application.

It may be clearly understood by persons skilled in the art that, for the purpose of convenient and brief description, reference may be made to the corresponding process in the foregoing method embodiments for detailed working processes of the foregoing systems, apparatus, and units, and details will not be described herein again.

In several embodiments provided in the present application, it should be understood that the disclosed systems, apparatus, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the scheme in the embodiments.

In addition, functional units in the embodiments of the present application may be integrated into one processing unit, or each of the units may exist alone physically, or two or more units are integrated into one unit.

If implemented in a form of a software functional unit and sold or used as an independent product, the functions may be stored in a computer readable storage medium. Based on such understanding, the technical solution of the present application essentially, or the part contributing to the prior art, or a part of the technical solution may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: any medium that can store program codes, such as a USB flash disk, a mobile hard disk, a read-only memory (ROM, Read-Only Memory), a random access memory (Random Access Memory, RAM), a magnetic disk, or an optical disc, etc.

The above descriptions are merely specific embodiments of the present application; however, the protection scope of the present application is not limited thereto. Any modification or replacement that may be readily envisaged of by persons skilled in the art within the technical scope disclosed in the present application should fall into the protection scope of the present application. Thus, the protection scope of the present application shall be subject to the claims.

What is claimed is:

1. A method for detecting a control channel, comprising:
receiving, by a terminal device, a first physical downlink control channel (PDCCH), wherein the first PDCCH is used to schedule a first data channel, and the first PDCCH carries first indication information which is used to indicate execution of a skipping operation for a PDCCH by the terminal device; and
executing, by the terminal device, the skipping operation in case of successful transmission of the first data channel.

2. The method according to claim 1, further comprising:
discarding, by the terminal device, the execution of the skipping operation in case of unsuccessful transmission of the first data channel.

3. The method according to claim 1, further comprising:
executing, by the terminal device, the skipping operation in case of unsuccessful transmission of the first data channel and successful retransmission of the first data channel.

4. The method according to claim 1, wherein the first indication information is further used to indicate a first time duration that comprises a time duration in which the skipping operation is executed.

5. The method according to claim 4, wherein starting time of the first time duration is time when the terminal device determines that the transmission of the first data channel is successful.

6. The method according to claim 4, wherein the first time duration comprises at least one time unit which is a PDCCH monitoring occasion or a slot.

7. The method according to claim 1, wherein the first data channel is a first physical downlink shared channel (PDSCH), and the method further comprises:
determining, by the terminal device according to whether the first PDSCH is decoded successfully, whether transmission of the first PDSCH is successful.

8. The method according to claim 1, wherein the first data channel is a first physical uplink shared channel (PUSCH), and the method further comprises:
determining, by the terminal device according to whether a second PDCCH is detected within a second time duration subsequent to reception of the first PDCCH, whether transmission of the first PUSCH is successful, wherein the second PDCCH is used to indicate retransmission of the first PUSCH by the terminal device.

9. The method according to claim 1, further comprising:
performing, by the terminal device, channel state information (CSI) measurement and/or aperiodic sounding reference signal (SRS) triggering during the execution of the skipping operation.

10. The method according to claim 1, wherein a search space to which the PDCCH being targeted by the skipping operation belongs is any search space monitored by the terminal device.

11. The method according to claim 1, wherein a search space to which the PDCCH being targeted by the skipping operation belongs is a dedicated search space, and/or a search space to which the PDCCH being targeted by the skipping operation belongs is a search space configured with a specific radio network temporary identifier (RNTI).

12. A terminal device, comprising:
a processor, a memory, and a transceiver,
wherein the memory is configured to store a computer program, and the processor is configured to call and run the computer program stored in the memory to:
control the transceiver to receive a first physical downlink control channel (PDCCH) within a time duration of a discontinuous reception (DRX) activity timer, wherein the first PDCCH is used to schedule a first data channel, and the first PDCCH carries first indication information which is used to indicate execution of a skipping operation for a PDCCH by the terminal device;
execute the skipping operation according to the first indication information; and
suspend counting of the activity timer or counting of a DRX inactivity timer during the execution of the skipping operation, wherein the inactivity timer is started when the terminal device receives the first PDCCH.

13. The terminal device according to claim 12, wherein the processor is further enabled to:
resume the counting of the activity timer or the counting of the inactivity timer after the execution of the skipping operation.

14. The terminal device according to claim 12, wherein the processor is enabled to:
execute the skipping operation according to the first indication information in case of successful transmission of the first data channel.

15. The terminal device according to claim 12, wherein the first indication information is further used to indicate a first time duration that comprises a time duration in which the skipping operation is executed.

16. The terminal device according to claim 15, wherein starting time of the first time duration is time when the terminal device determines that the transmission of the first data channel is successful.

17. The terminal device according to claim 15, wherein the first time duration comprises at least one time unit which is a PDCCH monitoring occasion or a slot.

18. The terminal device according to claim 14, wherein the first data channel is a first physical downlink shared channel (PDSCH), and the processing unit is further configured to:
determine, according to whether the first PDSCH is decoded successfully, whether transmission of the first PDSCH is successful.

19. The terminal device according to claim 14, wherein the first data channel is a first physical uplink shared channel (PUSCH), and the processor is further enabled to:
determine, according to whether a second PDCCH is detected within a second time duration subsequent to reception of the first PDCCH, whether transmission of the first PUSCH is successful, wherein the second PDCCH is used to indicate retransmission of the first PUSCH by the terminal device.

20. The terminal device according to claim 12, wherein the processor is further enabled to:
perform channel state information (CSI) measurement and/or aperiodic sounding reference signal (SRS) triggering during the execution of the skipping operation.

* * * * *